(No Model.)　　　　　　E. E. CLAUSSEN.　　　5 Sheets—Sheet 1.
SCREW MACHINE.

No. 504,102.　　　　　　　　Patented Aug. 29, 1893.

Witnesses
William A. Lorenz
William H. Honiss

Inventor
Edward E. Claussen (No Model.) 5 Sheets—Sheet 2.

E. E. CLAUSSEN.
SCREW MACHINE.

No. 504,102. Patented Aug. 29, 1893.

Witnesses
William A. Lorenz
William H. Honiss.

Inventor
Edward E. Claussen (No Model.) 5 Sheets—Sheet 3.

E. E. CLAUSSEN.
SCREW MACHINE.

No. 504,102. Patented Aug. 29, 1893.

Witnesses
William A. Lorenz
William H. Honiss

Inventor
Edward E. Claussen

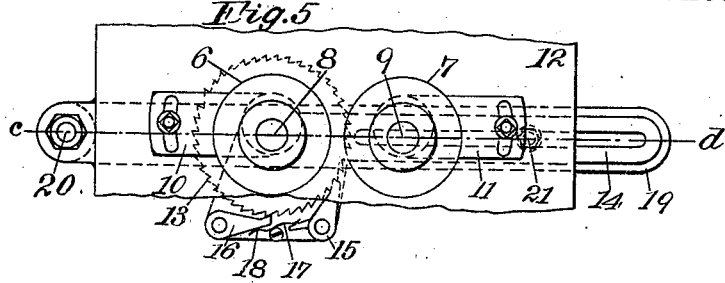
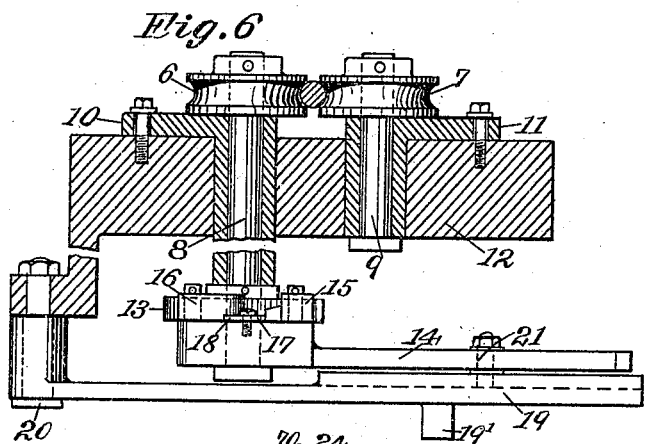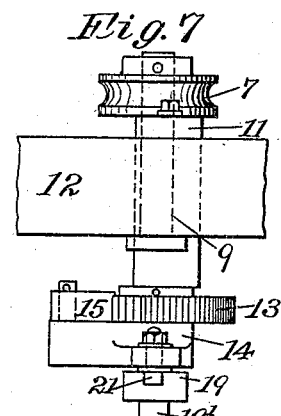
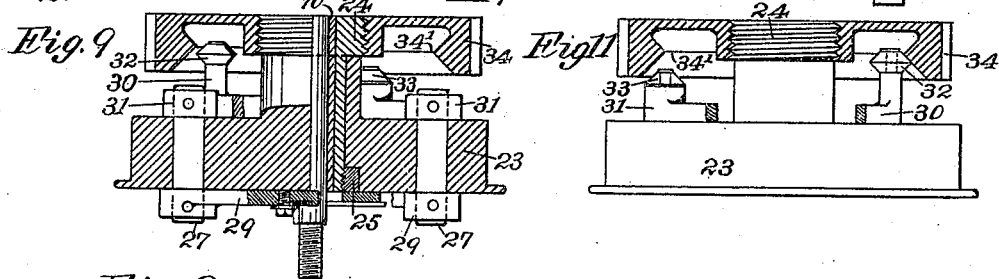
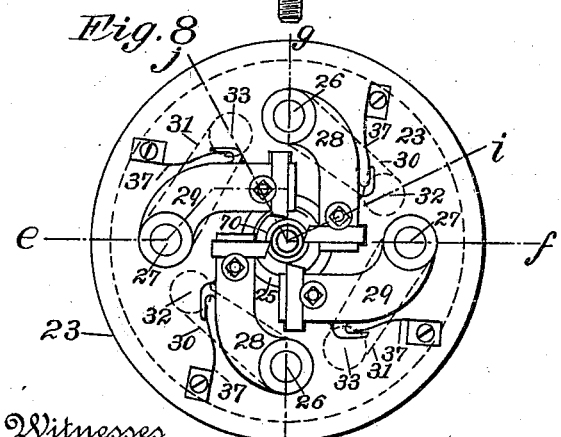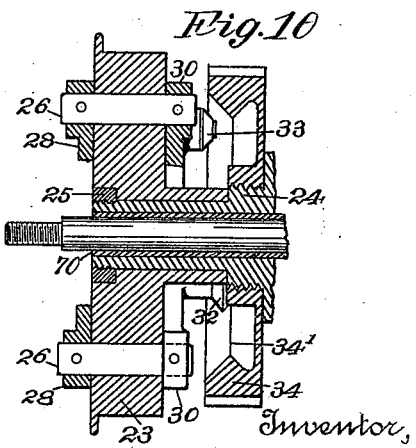

(No Model.)
E. E. CLAUSSEN.
SCREW MACHINE.
No. 504,102.
Patented Aug. 29, 1893.
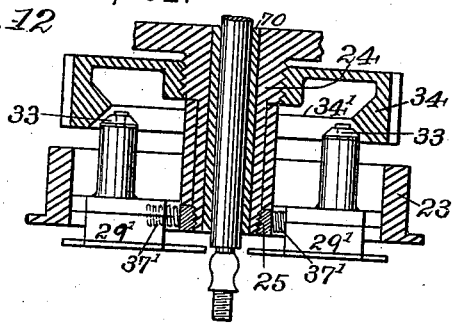
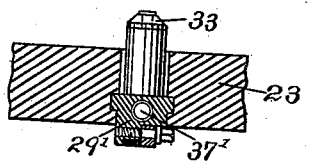
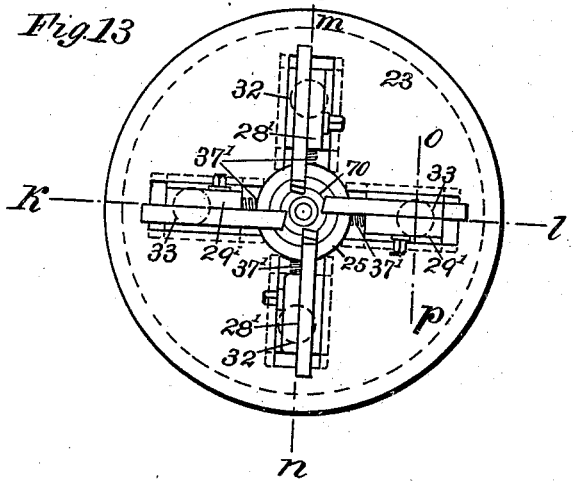
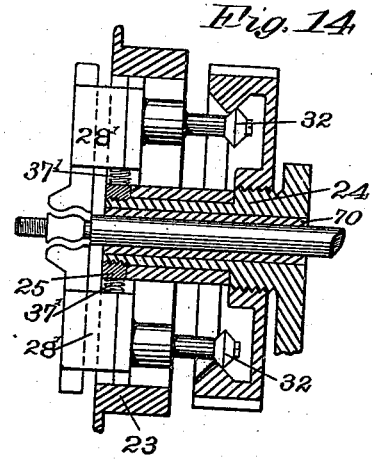
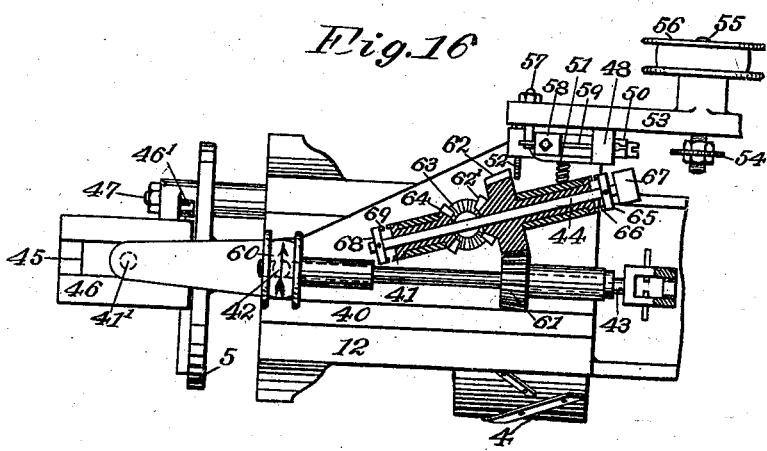
Witnesses
William A. Lorenz.
William H. Honiss.
Inventor,
Edward E. Claussen

UNITED STATES PATENT OFFICE.

EDWARD E. CLAUSSEN, OF HARTFORD, CONNECTICUT, ASSIGNOR OF ONE-HALF TO EMIL F. LINKE AND GEORGE MORTSON, OF SAME PLACE.

SCREW-MACHINE.

SPECIFICATION forming part of Letters Patent No. 504,102, dated August 29, 1893.

Application filed May 19, 1892. Serial No. 433,524. (No model.)

*To all whom it may concern:*

Be it known that I, EDWARD E. CLAUSSEN, a citizen of the United States, residing at Hartford, in the county of Hartford and State of Connecticut, have invented certain new and useful Improvements in Screw-Machines, of which the following is a full, clear, and exact specification.

My invention relates to improvements in machinery for automatically manufacturing screws from a coil or indefinite length of wire, the advance end of which is straightened and presented in a fixed position to the action of a series of revolving tool spindles.

It relates also to improved devices for forming and cutting off the screw blanks, which devices may commence their operations before the principal revolving tool spindles have finished their work upon the blank.

My invention comprises also an improved device for removing and slotting the screws as they are cut from the wire while the principal tool spindles are operating on the succeeding blank.

Figure 1:
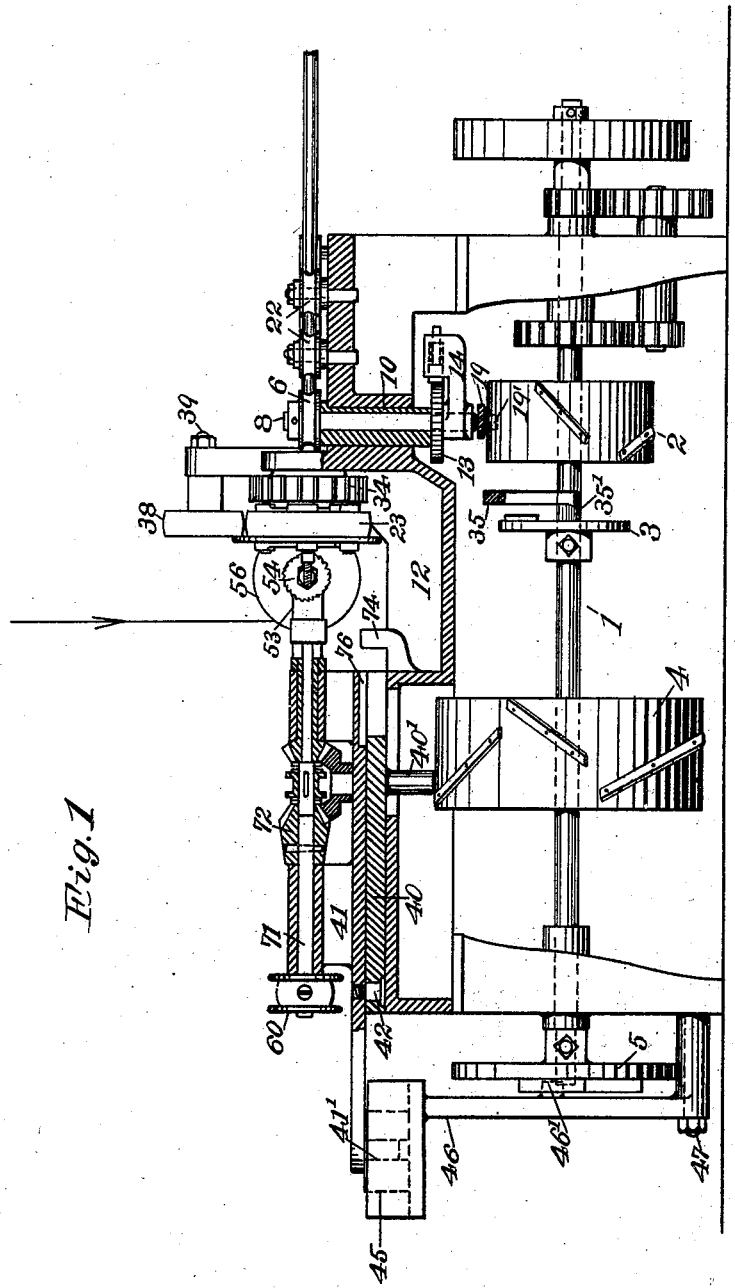
Figure 2:
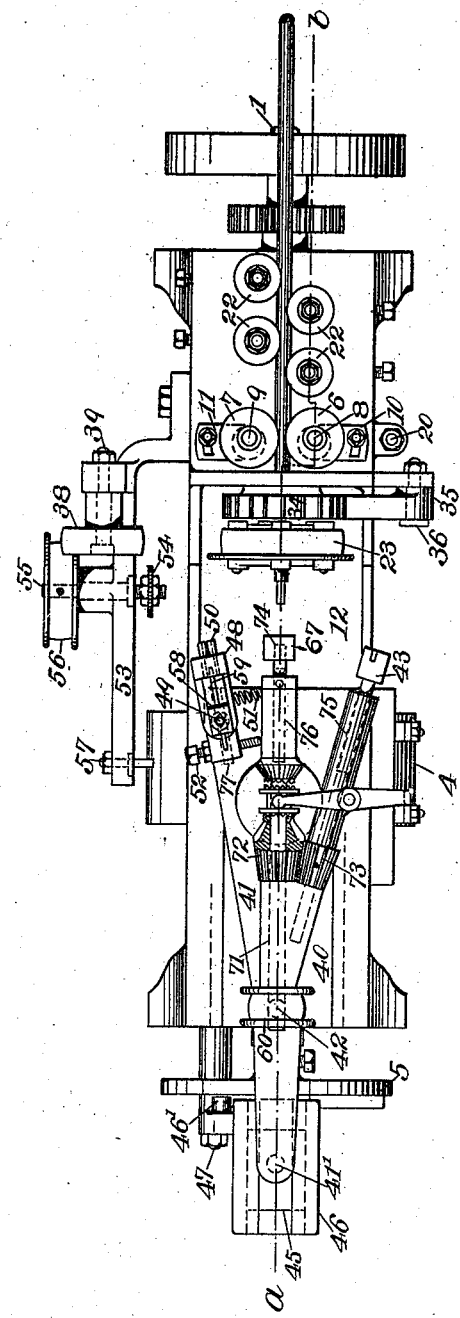
Figure 3:
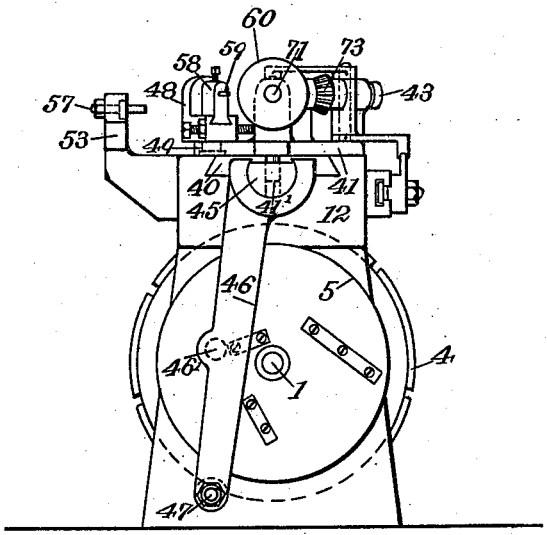
Figure 4:
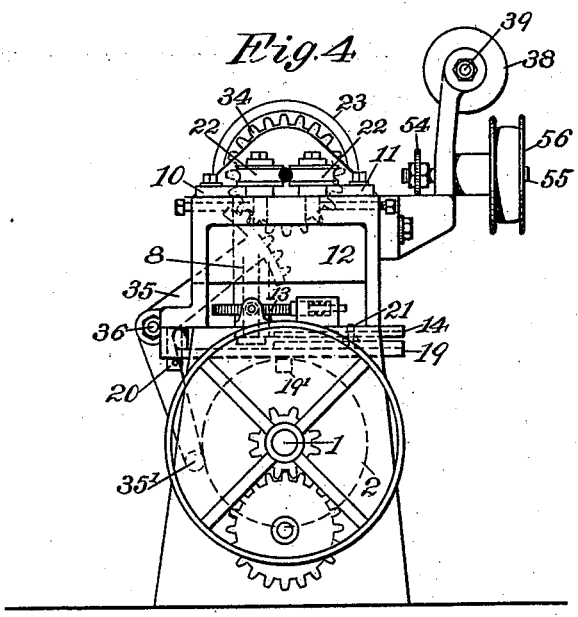

Figure 1 of the drawings represents a front view, partly in section, of my improved machine, the partial section being taken on the line *a—b* of Fig. 2. Fig. 2 is a plan view, and Figs. 3 and 4 are left and right hand end views respectively of the machine of Fig. 1. Figs. 5, 6, and 7, are a plan, an end, and a rear view respectively of my wire feeding mechanism, Fig. 6 being partly in section taken on the line *c—d* of Fig. 5. Fig. 8 is a left hand end view of one adaptation of my forming and cutting-off mechanism. Fig. 9 is a sectional view of the same, taken on the line *e—f* of Fig. 8. Fig. 10 is a sectional view on the line *g—h*, and Fig. 11 a part sectional view taken on the line *i—j* of Fig. 8. Fig. 12 is a sectional plan and Fig. 13 an end view of my forming and cutting-off mechanism, as I prefer to construct it, the section shown in Fig. 12 being on the line *k—l* of Fig. 13. Figs. 14 and 15 are sectional views taken on the lines *m—n* and *o—p*, respectively of Fig. 13. Fig. 16 is a plan view of my preferred arrangement of the principal tool spindles, showing the tapping spindle in section, and showing also the blank transferring device with the blank in position for slotting.

A description will first be given of the construction and operation of each section of the machine, and afterward their combined mode of operation will be described.

*The driving mechanism.*—The main cam shaft 1 is journaled on the legs of the machine and is driven by suitable gearing and an ordinary pulley as shown in Fig. 1. That shaft has fixed upon it the wire feed cam wheel 2, the cutting off cam wheel 3, the tool slide cam wheel 4, and the tool head indexing cam wheel 5. Those cam wheels are provided with detachable cam strips which are adjusted or replaced by others to give the desired motions.

*The wire feed mechanism.*—The wire feeding rolls 6 and 7 are fixed on the shafts 8 and 9 which are journaled in eccentric bushings 10 and 11 adjustably mounted on the main frame 12. By means of the eccentric bushings the rolls 6 and 7 may be adjusted so as to properly hold different sizes of wire. The lower end of the shaft 8 has fixed upon it the ratchet wheel 13, and has loosely mounted upon it the pawl arm 14 carrying the pawls 15 and 16 which are pressed against the ratchet by the springs 17 and 18 and which advance the ratchet wheel as the arm 14 is oscillated. Motion is communicated to the pawl arm from the cam arm 19 which is caused to oscillate upon its stud 20 by the cam 2 acting against a projection 19' of the arm 19. The arms 14 and 19 are provided with longitudinal slots into which the pin 21 is fitted, and that pin is provided with a nut for clamping it to the arm 14 at any part of the slot in that arm. When the pin is clamped at the end of the slot nearest the shaft 8 a much greater angular motion will be communicated to the arm 14 and consequently to the ratchet 13 than when the pin is clamped at the opposite end of the slot. Thus the amount of feed of the wire may be controlled by the adjustment of the pin 21. The construction and relation of these parts may best be seen by reference to Figs. 5, 6 and 7, which are enlarged views of that part of the mechanism. The pawls 15 and 16 are therein shown to be pivoted on the arm 14, instead of sliding, but in either case they are so located that when the point of one of them, as 15, engages with a tooth of the ratchet the point of the other pawl 16 is half way between two of the teeth, so that when the pawl arm is oscillated to an angular extent equal to one-half of that by which the teeth are separated the pawl 16 will engage with the next tooth. In this way the effect of the ratchet is equal to that produced by one having twice the number of teeth, while avoiding the excessively small teeth incident to the larger number. The function of the feeding rolls is to draw forward through the straightening rolls 22, a suitable length of wire for a screw and to hold it from turning while the tools are operating upon it.

*The forming and cutting-off mechanism.*— The head 23 revolves upon an extension 24 of the frame 12 and is held upon that extension by the screw collar 25. The head 23 has journaled upon it the shafts 26 and 27, which have fixed upon their left hand ends the tool arms 28 and 29 respectively. The arms 28 are provided with tools for forming or cutting down the stock, while the arms 29 are provided with tools for severing the finished blank from the wire rod. The shafts 26 and 27 have fixed upon their right hand ends the arms 30 and 31, provided with the beveled rollers 32 and 33 respectively. The annular cam 34 is fitted upon a threaded part of the frame extension 24 concentrically with the position of the rod or wire and is provided with gear teeth which engage with those of the sector 35. That sector is pivoted on the stud 36 fixed in the frame 12 and has the projection 35' adapted to engage with the cam 3, which communicates to the cam 34 an oscillatory motion. The cam 34 is also provided with an internal annular rib 34' which is adapted to engage with the beveled rollers 32 and 33, as that cam is oscillated and moved upon its thread toward and from the head 23. When moved toward that head the rollers 32 and 33 and the tools are caried toward the center of the rod and operate to form and cut off the blank from that rod; and as the cam 34 is rotated in the opposite direction and moved away from the head 23 the rollers and tools are carried outward by centrifugal force, aided if necessary by slight springs 37. For most purposes I prefer the construction shown in Figs. 12 and 15 inclusive, in which the tools and rollers are attached directly to the sliding tool blocks, 28', 29', the blocks 28' carrying the forming tools and the rollers 32 while the blocks 29' carry the cutting off tools and the rollers 33, the rollers being kept out against the annular cam by centrifugal force aided by the action of the springs 37'. The head 23 is caused to rotate by a belt which is driven from any convenient countershaft, and which passes partly around the saw pulley 56 in the direction of the arrow in Fig. 1, thence over the idle pulley 38, on the stud 39 which is fixed in the frame 12, thence under and partially around the head 23. The forming tool rollers 32 are beveled on both sides so that they may move outwardly behind the annular rib 34' as shown in Fig. 14 to allow the forming tools to rest clear of their work while the cutting off tools are severing the blank from the rod.

*The tool slide mechanism.*—The tool slide 40 is fitted to reciprocate in the frame 12 in a direction parallel with the position of the rod to be operated upon, and it is provided with the lug 40' which engages with the cam 4 by which it is caused to reciprocate at suitable times and to the desired extent. The tool head 41 is supported upon the slide 40 and is connected to it by the pivot stud 42 which is located in the same vertical plane with the center line of the wire rod. Upon the head 41 are journaled the cutting down and threading spindles 43 and 44, with their axes in the horizontal plane of the center of the wire rod, and intersecting each other in the vertical plane of the center of the wire rod and of the pivot stud 42; so that by the oscillation of the head 41 upon its stud the spindles may successively be brought into line with the wire rod. An extension 41' of the head 41 is fitted to the index block 45 which is carried on the index arm 46. That arm is pivoted on the stud 47 fixed in the frame 12, and has a projection 46' which engages with the cam 5, by means of which the head and spindles are indexed to their respective positions. Upon the frame 12 is the guide piece 74 which is adapted to enter the slots 75 76 and 77 in the tool head 41. Those slots are located beneath and parallel with the spindles 43 and 44 and the carrier block 48 respectively, so that the guide piece 74 enters those slots to guide and steady the front part of the head 41 when their respective spindles are operating upon the blank. As the slide 40 is drawn back to allow of bringing another spindle into operative position the head 41 is drawn clear of the guide 74 and may be oscillated to another position. The tool spindles, 43 and 44, may be arranged as shown in Fig. 2 or as in Fig. 16, the latter being my preferred construction; wherein the pulley 60, which receives motion by means of a belt from any convenient drum, is fixed upon the cutting down spindle 43 at a point nearly over the pivot 42, in order that the position of the pulley shall alter but slightly with the oscillation of the head 41. The spindle 43 carries upon its leading end a suitable box tool for cutting down the screw to the body size, and has also fixed upon it the bevel gear 61 which communicates motion to the double bevel gear 62. The smaller bevel 62' transmits motion by means of the intermediate gear 63 to the reversing bevel gear 64, which is journaled on the head 41 in line with the gear 62, so that the spindle 44 passes concentrically through them both. The leading end of that spindle has fixed upon it the collar 65 provided with the clutch pins 66 which engage with corresponding pins on the adjacent ends of the gear 62 when the die 67 is to be run on to the screw. Upon the opposite end of the shaft 44 is a similar collar 68 with pins 69 which engage with pins on the adjacent end of the gear 64 when the die 67 is to be backed off from the screw.

The transferring and slotting device is best shown in Figs. 2, 3 and 16, and consists of a carrier block 48 pivoted on the head 41 by the stud 49, and provided with a spring chuck 50 of a proper size to be pushed upon the body of the screw. The block is retained in a position radial to the pivot 42 as shown in Fig. 16, by the spring 51 and adjusting screw 52 in order that the chuck may be pushed upon the body of the screw when the chuck is brought into alignment with it by the oscillation of the head 41. As that head moves to the position shown in Fig. 16 the block is carried against the parallel guide 53 of the frame 12 and takes the position shown in that figure, and as the head 41 is carried forward in the operation of cutting down the next blank with the spindle 43, the screw is carried against the saw 54 which cuts the slot therein. The saw is carried on the spindle 55 which is journaled in the frame 12, and has fixed upon it the pulley 56 which is driven by a belt as before described in connection with the forming and cutting off mechanism. As the slide 41 is moved backward to disengage the spindle 43 from the rod, the adjustable stop 57 collides with the slide 58 carrying the ejector rod 59 which pushes the slotted screw out of the chuck whence it falls into a convenient box. As the head 41 is oscillated to bring the spindle 44 into line for threading the blank then on the rod the block is caused to resume its normal position radial to the pivot 42 by means of the spring 51.

The consecutive operation of the machine as a whole, is as follows: A coil of wire of suitable size is arranged upon a reel adjacent to the machine and the end of the wire is passed through the straightening rolls 22, the feeding rolls 6 and 7, and the bushing 70, so that a suitable length is presented beyond the end of that bushing. The eccentric bushings 10 and 11 are adjusted so that the wire is tightly gripped by the feeding rolls. The cutting down spindle 43 first operates on the rod as previously described. Then the threading spindle is brought into line and as the die is pressed against the end of the blank the clutch pins 66 are engaged by the pins on the advancing gear 62 by which the spindle is turned and the die forced upon the rod. When the thread is cut far enough the feed of the slide 40 is reversed by the cam 4 and the clutch pins 69 engage with those on the reversing gear 64 by which the die is backed off from the screw. If no forming operation is necessary upon the head of the screw the cutting off operation may begin while the thread is being cut, and if a forming operation is needed, such as shaving or chamfering the head as shown in Fig. 14, that operation may begin while the thread is being cut, and be immediately followed by the cutting off operation, during which the forming tools rest clear of the work as shown in Fig. 14. Meanwhile the transferring block has been brought into position and the chuck passed upon the body of the screw which when severed from the rod is carried to the position shown in Fig. 16 and slotted as previously described, while the cutting down spindle is at work upon the next blank, which has been fed forward by the action of the feeding rolls and the cam 2. A modified construction of my tool spindle arrangement is shown in Figs. 1, 2, and 3, in which the driving pulley 60 is fixed on the threading spindle 71 from which motion is communicated to the cutting down spindle 43 by means of the bevel gears 72 and 73 fixed thereon. In other respects the construction and mode of operation of the threading and reversing clutch mechanism shown in the figures are similar to that shown and described in another application for Letters Patent bearing even date herewith; and it is herein shown only for the purpose of explaining its adaptation to the present invention. But in this invention I prefer the arrangement shown in Fig. 16, as I am thereby enabled to have the driving pulley directly on the cutting down spindle, which ordinarily performs heavier work than the others.

I claim as my invention—

1. In combination with means for holding a wire rod from rotating, and which allow it to move only in the direction of its length, a series of revolving tool spindles and an intermittently oscillating bed on which those spindles are journaled, arranged and operating to present those tool spindles successively to that wire rod, all substantially as described.

2. In combination with means for holding a wire rod from rotating, and which allow it to move only in the direction of its length, a series of revolving tool spindles journaled on an intermittently oscillating bed, and a reciprocating slide on which that bed is mounted, arranged and operating to advance and retract those spindles toward and from the rod as they are presented to it, all substantially as described.

3. In combination with means for holding a wire rod from rotating, and which allow it to move only in the direction of its length, a series of revolving tool spindles journaled on an intermittently oscillating head, a slide on which that head is mounted, and a cam wheel, arranged and operating to reciprocate that slide to the extent and at the rate required by the respective spindles when in their operative position, all substantially as described.

4. In combination with means for holding a wire rod from rotating, and which allow it to move only in the direction of its length, a slide carrying a pivot located and reciprocating in the plane of the wire rod, a tool head adapted to oscillate upon that pivot, and a series of revolving tool spindles journaled upon that head with their axes radial to that pivot, whereby those axes may successively be brought into line with the center of the wire rod and reciprocated in the direction of that line, substantially as described.

5. The combination of a series of revolving spindles radially journaled on an intermittently oscillating head which is provided with radial slots corresponding in position with the respective spindles, a reciprocating slide on which that head is pivoted, and a guide piece 74 adapted to enter the slots corresponding to the respective spindles as they are brought into operative position and carried forward by the reciprocation of the slide, all substantially as described.

6. In a machine for making screws, the combination of means for holding a wire rod from rotating and for feeding it in the direction of its length, a revolving tool carrier, journaled concentrically with that wire rod, and provided with cutting tools, with means for feeding those tools to the wire rod, consisting of the cam plate 34, the sector 35 and the cam 3, all substantially as described.

7. The combination of a revolving carrier having oppositely disposed radially sliding tool blocks thereon, with a threaded cam plate adjacent to that carrier, and mechanism for rotating that cam plate upon its thread whereby it is advanced against the engaging ends of the tool blocks substantially as described.

8. In combination with means for holding a wire rod from rotating, a revolving carrier having oppositely disposed radially sliding tool blocks, and a threaded cam plate having an annular cam rib which is adapted to engage those blocks and carry them toward the center of revolution when that cam plate is rotated and advanced upon its thread, substantially as described.

9. A revolving carrier having oppositely disposed tool holders mounted thereon, provided with the beveled rollers 32, and a cam plate 34 having a beveled internal annular rib adapted to engage those rollers and carry them toward the center of revolution and to release them again substantially as described.

10. In combination with means for holding a wire rod from rotating and which allow it to move only in the direction of its length, a threading device mounted on a head which is adapted to carry it into operative relation to the rod, the said device consisting of the bevel gears 62 and 64 adapted to revolve in opposite directions, the die carrying spindle 44, and the clutches 65 and 68 arranged and operating to alternately engage with one and the other of those gears, substantially as described.

11. In combination with means for holding a wire rod from rotating, and with a revolving cutting off device, the carrier 48 mounted on an intermittently oscillating head, and adapted to pass upon and support the body of a screw while it is being severed from the rod, and also operating to carry it aside when severed, substantially as described.

12. In a machine for making screws, a transferring and holding device for slotting the same, consisting of the carrier 48 pivoted on an intermittently oscillating head, a spring 51 and the guide piece 53, the latter operating to turn the carrier and guide it in the plane of the slotting saw, all substantially as described.

EDWARD E. CLAUSSEN.

Witnesses:
WILLIAM A. LORENZ,
WILLIAM H. HONISS.